United States Patent
Ryu

(10) Patent No.: US 10,054,781 B2
(45) Date of Patent: Aug. 21, 2018

(54) MICROSCOPE, SHEET-ILLUMINATION MICROSCOPE, AND MICROSCOPE-IMAGE ACQUIRING METHOD

(71) Applicant: OLYMPUS CORPORATION, Hachioji-shi, Tokyo (JP)

(72) Inventor: Go Ryu, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 163 days.

(21) Appl. No.: 15/131,613

(22) Filed: Apr. 18, 2016

(65) Prior Publication Data

US 2016/0320601 A1 Nov. 3, 2016

(30) Foreign Application Priority Data

May 1, 2015 (JP) .................................. 2015-093750
Apr. 5, 2016 (JP) .................................. 2016-075635

(51) Int. Cl.
*G02B 21/16* (2006.01)
*G02B 21/00* (2006.01)
(Continued)

(52) U.S. Cl.
CPC ......... *G02B 21/16* (2013.01); *G02B 21/0032* (2013.01); *G02B 21/0076* (2013.01);
(Continued)

(58) Field of Classification Search
CPC ........ G02B 21/16; G02B 21/26; G02B 21/06; G02B 21/0032; G02B 21/241; H04N 5/2256; H04N 5/23212; H04N 5/2254
See application file for complete search history.

(56) References Cited

U.S. PATENT DOCUMENTS 9,645,378 B2 * 5/2017 Hilbert .................. G02B 21/06
2009/0114152 A1 * 5/2009 Aramaki ............... C23C 16/463
118/712
(Continued)

FOREIGN PATENT DOCUMENTS

WO 2011120629 A1 10/2011
WO 2014056992 A1 4/2014

OTHER PUBLICATIONS

Extended European Search Report (EESR) dated Sep. 20, 2016, issued in counterpart European Application No. 16165540.2.
(Continued)

*Primary Examiner* — Behrooz Senfi
(74) *Attorney, Agent, or Firm* — Holtz, Holtz & Volek PC

(57) ABSTRACT

A microscope apparatus includes a detection optical system that detects fluorescence produced in a specimen immersed in a medium having a different refractive index from air and accommodated in a container and acquires a fluorescence image. An illumination device focuses excitation light emitted from an excitation-light source, in the form of a plane along a plane intersecting an optical axis of the detection optical system and makes the planar excitation light incident on the specimen in the container. A driving unit moves the specimen in a direction of an optical axis of a cylindrical lens. An illumination control unit adjusts a focal position of the illumination device based on a movement amount of the specimen moved by the driving unit such that an air-equivalent length along an optical path of the excitation light from the illumination device to the optical axis of the detection optical system remains constant.

14 Claims, 7 Drawing Sheets

(51) Int. Cl.
*G02B 21/36* (2006.01)
*G02B 21/06* (2006.01)
*G02B 21/24* (2006.01)
*G02B 21/26* (2006.01)
*H04N 5/225* (2006.01)

(52) U.S. Cl.
CPC ........... *G02B 21/06* (2013.01); *G02B 21/241* (2013.01); *G02B 21/26* (2013.01); *G02B 21/367* (2013.01); *H04N 5/2256* (2013.01)

(56) References Cited

U.S. PATENT DOCUMENTS

2015/0247999 A1* 9/2015 Ntziachristos ....... A61B 5/6852
 348/80
2015/0286042 A1* 10/2015 Hilbert ................. G02B 21/002
 250/459.1

OTHER PUBLICATIONS

Ritter, et al., "A cylindrical zoom lens unit for adjustable optical sectioning in light sheet microscopy", Biomedical Optics Express 185, vol. 170, No. 347, Jan. 2012, pp. 211-219.
Ritter, et al., "Single molecule tracking with light sheet microscopy", Dissertation, Mar. 2011, pp. 73-91.

* cited by examiner

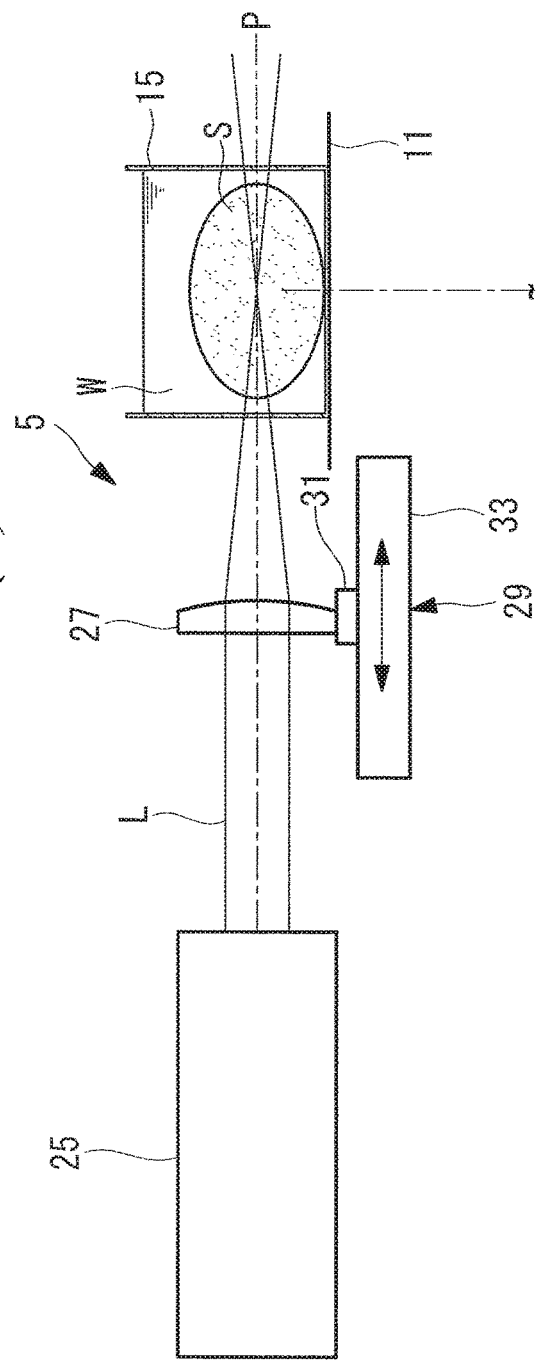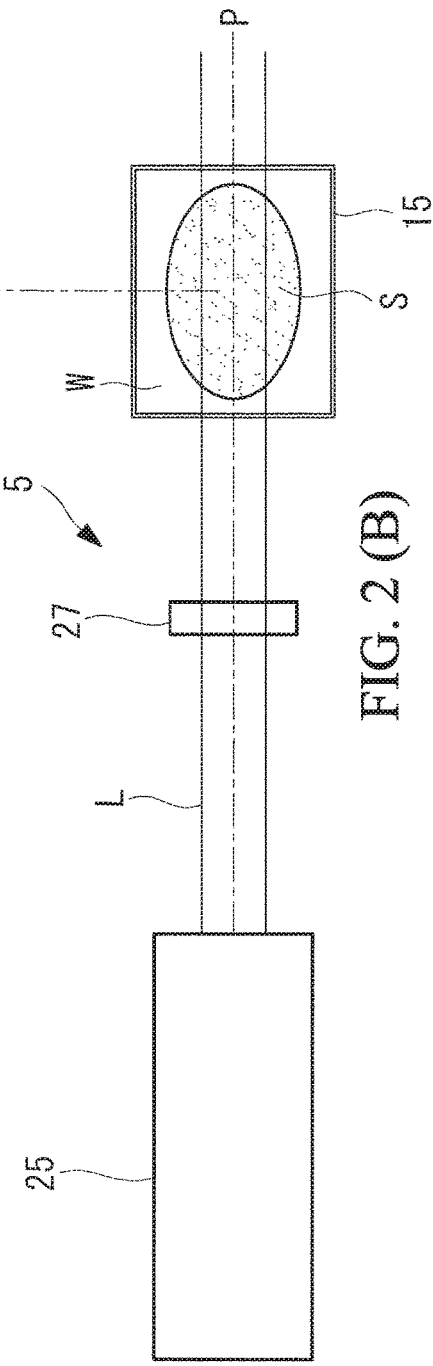

$X = \Delta x \cdot (1/n1 - 1/n2)$

FIG. 7 (A)
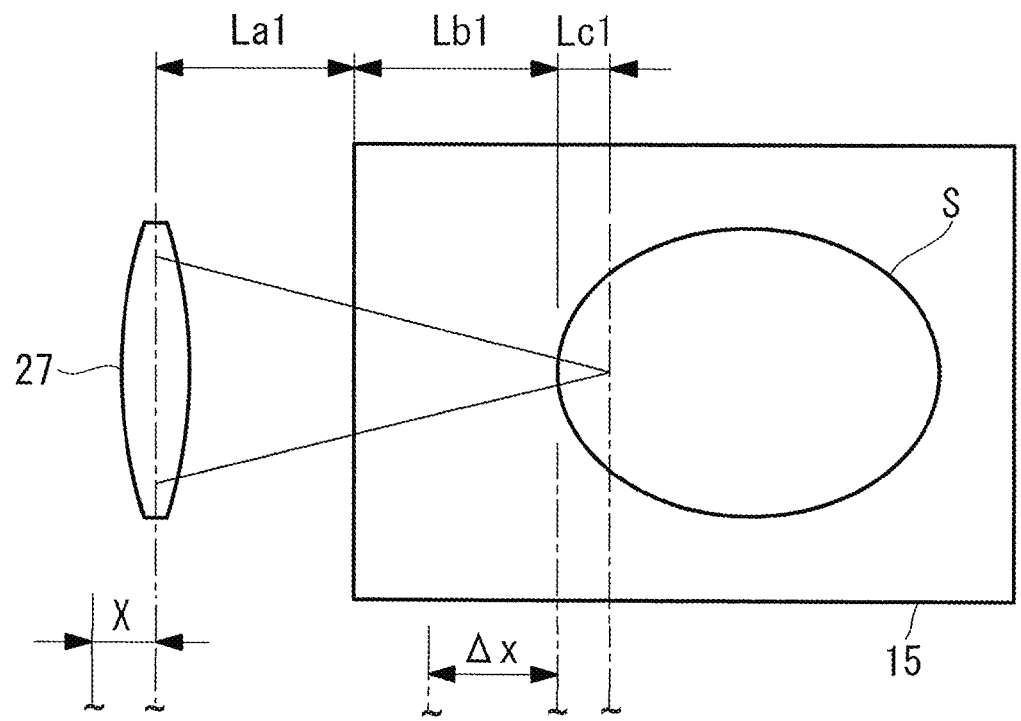
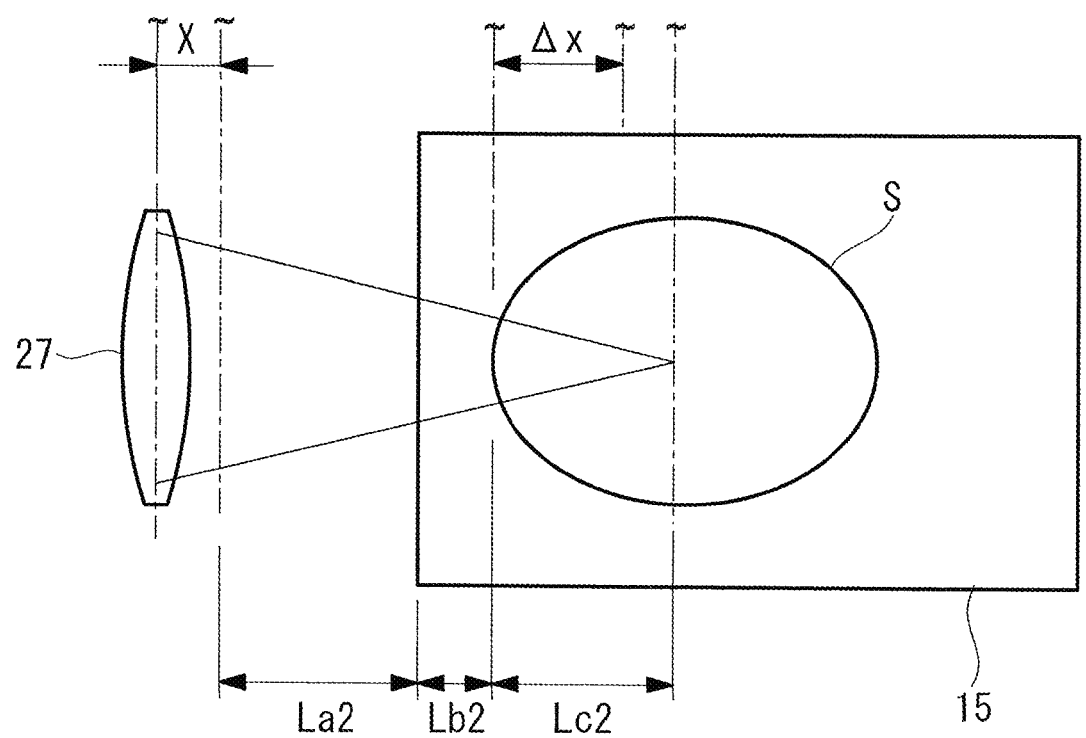
FIG. 7 (B)

MICROSCOPE, SHEET-ILLUMINATION MICROSCOPE, AND MICROSCOPE-IMAGE ACQUIRING METHOD

CROSS-REFERENCE TO RELATED APPLICATIONS

This application is based on Japanese Patent Application No. 2015-093750 and No. 2016-075635, the contents of which are incorporated herein by reference.

TECHNICAL FIELD

The present invention relates to a microscope, a sheet-illumination microscope, and a microscope-image acquiring method.

BACKGROUND ART

There are conventionally-known microscopes using a sheet illumination method in which excitation light focused in the form of a plane by an illumination optical system is made incident on a specimen along an incident plane intersecting the optical axis of a detection optical system that detects fluorescence from the specimen (for example, see PTL 1). In an epi-illumination method or a transmitted illumination method, excitation light focused at a single point or a plurality of points is two-dimensionally scanned, thereby acquiring a two-dimensional image. According to the sheet illumination method, a wide area can be illuminated at one time, and only an area in which excitation light is focused in a focal plane of the detection optical system is illuminated, thus making it possible to reduce the time required to acquire an image.

CITATION LIST

Patent Literature

{PTL 1} PCT International Publication No. WO 2011/120629

SUMMARY OF INVENTION

According to a first aspect, the present invention provides a microscope including: a detection optical system that detects fluorescence produced in a specimen immersed in a medium having a different refractive index from air and accommodated in a container and that acquires a fluorescence image; a sheet-illumination optical system that focuses excitation light emitted from a light source, in the form of a plane along a plane intersecting the optical axis of the detection optical system and that makes the planar excitation light incident on the specimen in the container; a driving unit that moves the specimen in the direction of the optical axis of the sheet-illumination optical system; and a focal-position adjusting unit that adjusts a focal position of the sheet-illumination optical system so as not to be shifted from the position of the optical axis of the detection optical system, when the specimen is moved by the driving unit, thereby causing a change in the air-equivalent length along the optical path of the excitation light from the sheet-illumination optical system to the optical axis of the detection optical system.

According to a second aspect, the present invention provides a sheet-illumination microscope in which a specimen immersed in a medium having a different refractive index from air is irradiated with illumination light in the form of a sheet from a direction intersecting an observation optical axis and is observed, the sheet-illumination microscope including: an objective lens that collects light produced in the specimen, which is immersed in the medium and is accommodated in a container; a detector that detects the light collected by the objective lens; a sheet-illumination optical system that focuses, in the form of a plane, illumination light emitted from a light source and that makes the planar illumination light incident on the specimen in the container along a plane intersecting the optical axis of the objective lens; a focal-point adjusting mechanism that moves the focal position of the sheet-illumination optical system in the direction of the optical axis of the sheet-illumination optical system; a stage that can move at least one of the container and the specimen in the direction of the optical axis of the sheet-illumination optical system; and a controller that controls the focal-point adjusting mechanism in conjunction with the movement of the stage in the direction of the optical axis.

According to a third aspect, the present invention provides a microscope-image acquiring method including: moving a specimen immersed in a medium having a different refractive index from air and accommodated in the container in the direction along the optical axis of a sheet-illumination optical system, intersecting the optical axis of a detection optical system; focusing, with the sheet-illumination optical system, excitation light emitted from a light source, in the form of a plane along a plane intersecting the optical axis of the detection optical system and making the planar excitation light incident on the specimen; adjusting the focal position of the sheet-illumination optical system so as not to be shifted from the position of the optical axis of the detection optical system, when the specimen is moved, thereby causing a change in the air-equivalent length along the optical path of the excitation light from the sheet-illumination optical system to the optical axis of the detection optical system; and detecting, with the detection optical system, fluorescence produced in the specimen on which the excitation light is made incident.

BRIEF DESCRIPTION OF DRAWINGS

FIG. 2(A) is a view of an illumination device and a specimen shown in FIG. 1, seen from the direction perpendicular to a detection optical axis and an illumination optical axis; and FIG. 2(B) is a view of the illumination device and the specimen shown in FIG. 1, seen from the direction along the detection optical axis.

FIG. 7(A) is a view of FIG. 6(A), seen from the direction along the detection optical axis; and FIG. 7(B) is a view of FIG. 6(B), seen from the direction along the detection optical axis.

DESCRIPTION OF EMBODIMENTS

In a conventional microscope using the sheet illumination method, when a specimen that is immersed in a medium having a different refractive index from air and that is accommodated in a container is moved, together with the container, in the direction of the optical axis of the illumination optical system, because the ratios of the thicknesses, in the direction of the optical axis of the illumination optical system, of air, the medium in the container, and the specimen, which exist in the optical path of excitation light from the illumination optical system to the optical axis of the detection optical system, are changed, the focal position of excitation light is shifted with respect to the optical axis of the detection optical system. Thus, even when different positions on the specimen in the direction of the optical axis of the illumination optical system are to be observed, clear images cannot be acquired.

The present invention provides a microscope, a sheet-illumination microscope, and a microscope-image acquiring method in which, with the sheet illumination method, clear images can be acquired when different positions on the specimen in the direction of the optical axis of the illumination optical system are observed.

In view of the above, embodiments of the present invention are described below.

First Embodiment

A microscope and a microscope-image acquiring method according to a first embodiment of the present invention will be described below with reference to the drawings.

Figure 1:
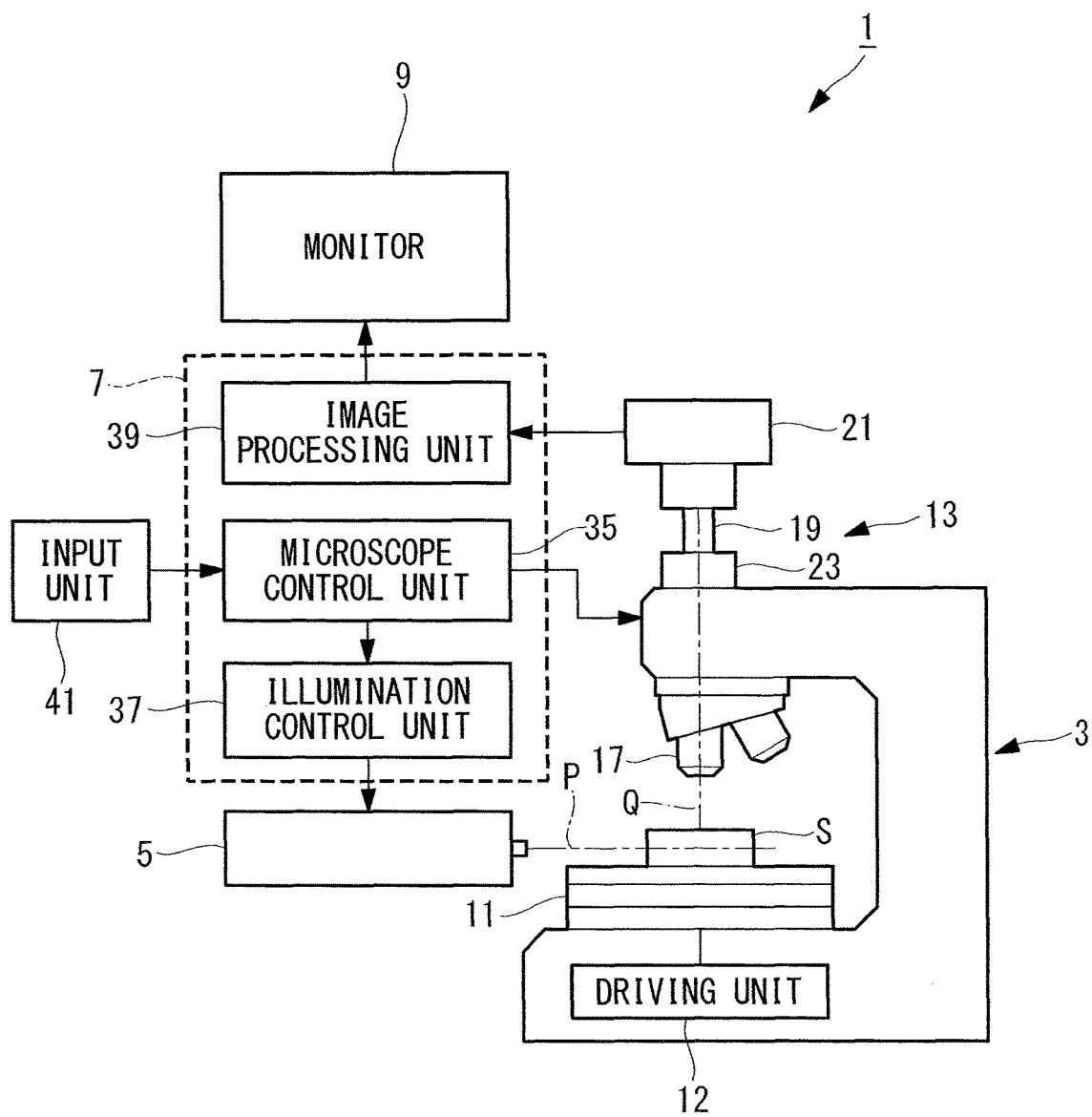
FIG. 1 is a view showing, in outline, the configuration of a microscope according to a first embodiment of the present invention.

As shown in FIG. 1, a microscope (sheet-illumination microscope) 1 of this embodiment is provided with a microscope body 3, an illumination device 5 that is connected to the microscope body 3, and a control device 7 that controls the microscope body 3 and the illumination device 5. A monitor 9 is connected to the control device 7, so that an image acquired by the microscope body 3 can be displayed on the monitor 9.

The microscope body 3 is provided with a stage 11 on which a specimen S is mounted, a driving unit 12 that drives the stage 11, and a detection optical system (detector) 13 that has a detection optical axis (hereinafter, referred to as optical axis Q) extending in the direction perpendicular to an illumination optical axis (hereinafter, referred to as optical axis P) and that detects fluorescence produced in the specimen S on the stage 11, thus acquiring an image (fluorescence image) of the specimen S.

As shown in FIG. 2(A), the specimen S is accommodated in a container 15 mounted on the stage 11. The container 15 is filled with water (medium) W, and the specimen S is immersed in the water W. The container 15 is formed of a material through which excitation light emitted from the illumination device 5 can be transmitted, and a portion of the container 15 facing the detection optical system 13 is open.

The stage 11 can be moved by the driving unit 12 in the detection-optical-axis direction and in the two-dimensional directions in a plane perpendicular to the detection-optical-axis direction.

As shown in FIG. 1, the detection optical system 13 is provided with an objective lens 17 that is disposed, facing the specimen S, in the direction perpendicular to the specimen S on the stage 11, i.e., in the direction perpendicular to a mounting surface of the stage 11, an imaging lens 19 that images fluorescence coming from the specimen S and collected by the objective lens 17, and an imaging element 21, such as a CCD, that captures the fluorescence imaged by the imaging lens 19, thus acquiring an image signal. In the figure, reference sign 23 denotes a filter wheel having barrier filters for removing excitation light contained in fluorescence.

As shown in FIGS. 2(A) and 2(B), the illumination device 5 is provided with an excitation-light source (light source) 25 that emits excitation light L formed of approximately-collimated light, a cylindrical lens (sheet-illumination optical system) 27 that focuses the excitation light emitted from the excitation-light source 25 into a line (plane) having a predetermined width dimension that is equal to the beam diameter dimension of the excitation light, and a movement mechanism (focal-point adjusting mechanism) 29 that can move the cylindrical lens 27 in the direction along the optical axis P.

The cylindrical lens 27 has power in one direction perpendicular to the optical axis P. The cylindrical lens 27 focuses excitation light in the form of a sheet along a plane perpendicular to the optical axis Q of the detection optical system 13, so that the sheet-shaped excitation light along the incident plane extending in the direction perpendicular to the optical axis Q can be made incident on the specimen S through the container 15.

In the example shown in FIG. 2(A), the movement mechanism 29 is provided with a slider 31 that supports the cylindrical lens 27, a linear guide 33 that movably guides the slider 31 in the direction along the optical axis P of the cylindrical lens 27, and a motor (not shown) that linearly moves the slider 31 along the linear guide 33.

The control device 7 is provided with a PC (Personal Computer (not shown)) and a control board (not shown) that performs signal input/output between the PC and various electrical units, such as the stage 11 and the movement mechanism 29 of the illumination device 5. The PC is provided with a memory (not shown) that stores an image processing program, a microscope control program, and an illumination control program and an arithmetic processing unit (not shown) that has a function for reading the programs stored in the memory and executing each of the programs.

Specifically, the arithmetic processing unit of the PC functions as a microscope control unit that controls the microscope body 3 through execution of the microscope control program, functions as an illumination control unit that controls the illumination device 5 through execution of the illumination control program, and functions as an image processing unit that processes an image signal acquired by the imaging element 21, through execution of the image processing program. Hereinafter, the arithmetic processing unit of the PC will be described as a microscope control unit 35, an illumination control unit (focal-position adjusting unit) 37, and an image processing unit 39. Furthermore, FIG. 1 shows, as the components of the control device 7, the microscope control unit 35, the illumination control unit (focal-position adjusting unit, controller) 37, and the image processing unit 39. An input device 41, such as a mouse or a keyboard, for allowing a user to input an instruction is connected to the control device 7.

Through execution of the microscope control program stored in the memory of the PC, the microscope control unit 35 can control the microscope body 3, e.g., can replace the objective lens 17 or the imaging lens 19 or adjust the magnification thereof and can activate the filter wheel 23 to change the filter, on the basis of the user's instruction input through the input device 41. Furthermore, similarly, through execution of the microscope control program, the microscope control unit 35 controls the driving unit 12 on the basis of information about the movement direction and the movement amount for the stage 11, which are input by the user, to move the stage 11, thus changing the position of the specimen S.

When the stage 11 is moved in the direction along the optical axis P of the cylindrical lens 27, in conjunction with this movement of the stage 11, the illumination control unit 37 adjusts the focal position of the cylindrical lens 27 through execution of the illumination control program, which is stored in the memory of the PC. Specifically, the illumination control unit 37 adjusts the focal position of the cylindrical lens 27 on the basis of the movement direction and the movement amount of the specimen S moved by the stage 11 together with the container 15, such that the air-equivalent length along the optical path of excitation light from the cylindrical lens 27 to the optical axis Q of the detection optical system 13 is maintained constant.

The air-equivalent length is the length obtained by converting the optical path length in a substance having a different refractive index from air into the optical path length in air. The air-equivalent length of the optical path in a substance having a refractive index n is the value obtained by multiplying the optical path length in the substance having the refractive index n by 1/n. In this embodiment, the sum of air-equivalent lengths along the optical path of excitation light in the layers of air, the water W, and the specimen S existing from the cylindrical lens 27 to the optical axis Q of the detection optical system 13 is maintained constant. The air-equivalent length in the air layer is the thickness of the air layer itself.

The illumination control unit 37 shifts, using the movement mechanism 29, the position of the cylindrical lens 27 in the direction along the optical axis P by the amount corresponding to the shift of the focal position of the cylindrical lens 27 with respect to the optical axis Q of the detection optical system 13 in the direction along the optical axis P in conjunction with the movement of the specimen S in the direction along the optical axis P, thereby maintaining constant the air-equivalent length along the optical path of excitation light from the cylindrical lens 27 to the optical axis Q of the detection optical system 13. The movement amount for the cylindrical lens 27 is calculated by the PC on the basis of the movement amount of the stage 11 when the illumination control unit 37 executes the illumination control program.

Here, a shift amount for the focal position of the cylindrical lens 27 with respect to the optical axis Q of the detection optical system 13, i.e., an amount by which the cylindrical lens 27 is to be moved in the direction along the optical axis P, can be calculated on the basis of the refractive indexes of air, the water W, and the specimen S, which exist between the cylindrical lens 27 and the optical axis Q of the detection optical system 13, and the movement amount of the specimen S moved in the direction along the optical axis P.

In this embodiment, it is assumed that the refractive index of the specimen S is the same as the refractive index of the water W. When the refractive index of air is set to 1.0, and the refractive indexes of the water W and the specimen S are set to n, the optical path length (Lb) in water is calculated by Equation (1):

$$Lb = (f - La) \times (n) \quad (1)$$

where f is the focal distance of the cylindrical lens 27, and La is the optical path length in air.

Furthermore, an amount (X) by which the cylindrical lens 27 is to be moved in conjunction with movement of the specimen S in the direction along the optical axis P is calculated by Equation (2):

$$X = (\Delta x) \times (1 - 1/n) \quad (2)$$

where $\Delta x$ is the movement amount of the specimen S.

Furthermore, when the specimen S is moved together with the container 15 along the optical axis P in the direction toward the cylindrical lens 27, the ratio of the thickness of the air layer, whose refractive index is small, is reduced, and the ratio of the thickness of the specimen S layer, whose refractive index is large, is accordingly increased, in the range from the cylindrical lens 27 to the optical axis Q of the detection optical system 13. Thus, the focal position of the cylindrical lens 27, which has been made coincident with the optical axis Q of the detection optical system 13, is shifted in the direction away from the cylindrical lens 27.

In this case, the illumination control unit 37 moves the cylindrical lens 27, by the movement amount for the cylindrical lens 27 calculated on the basis of the movement amount of the specimen S, along the optical axis P in the direction away from the optical axis Q of the detection optical system 13.

On the other hand, when the specimen S is moved together with the container 15 along the optical axis P in the direction away from the cylindrical lens 27, the ratio of the thickness of the air layer, whose refractive index is small, is increased, and the ratio of the thickness of the specimen S layer, whose refractive index is large, is accordingly reduced, in the range from the cylindrical lens 27 to the optical axis Q of the detection optical system 13. Thus, the focal position of the cylindrical lens 27, which has been made coincident with the optical axis Q of the detection optical system 13, is shifted in the direction toward the cylindrical lens 27.

In this case, the illumination control unit 37 moves the cylindrical lens 27, by the movement amount for the cylindrical lens 27 calculated on the basis of the movement amount of the specimen S, along the optical axis P in the direction toward the optical axis Q of the detection optical system 13.

The image processing unit 39 processes an image signal sent from the imaging element 21 into an image, by executing the image processing program stored in the memory of the PC.

Next, the microscope-image acquiring method of this embodiment will be described.

Figure 5:
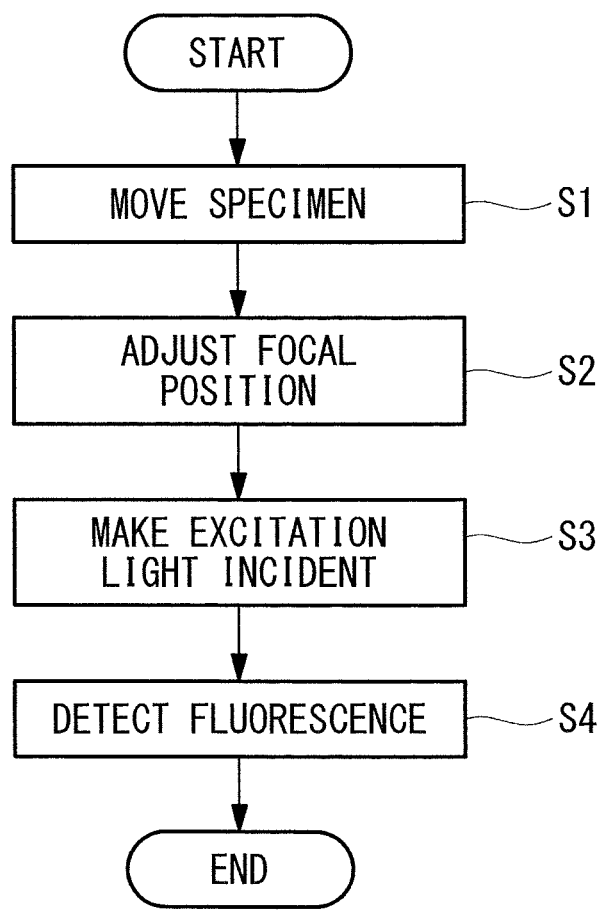
FIG. 5 is a flowchart for explaining a microscope-image acquiring method according to the first embodiment of the present invention.

As shown in the flowchart in FIG. 5, the microscope-image acquiring method of this embodiment includes: a movement step S1 of moving the specimen S, which is immersed in the water W and accommodated in the container 15, in the direction along the optical axis P of the cylindrical lens 27, together with the container 15; a focal-position adjustment step S2 of adjusting the focal position of the cylindrical lens 27 on the basis of the movement amount of the specimen S moved in the movement step S1, such that the air-equivalent length along the optical path of excitation light from the illumination device 5 to the optical axis Q of the detection optical system 13 is maintained constant; an incidence step S3 of focusing, with the cylindrical lens 27, excitation light emitted from the excitation-light source 25 in the form of a sheet along a plane intersecting the optical axis Q of the detection optical system 13 and of making the sheet-shaped excitation light incident on the specimen S; and a detection step S4 of detecting, with the detection optical system 13, fluorescence produced in the specimen S on which the excitation light is made incident in the incidence step S3.

The operation of the thus-configured microscope 1 and microscope-image acquiring method will now be described.

In order to observe the specimen S by using the microscope 1 and the microscope-image acquiring method of this embodiment, the container 15, in which the specimen S is immersed in the water W, is mounted on the stage 11, and the objective lens 17 is disposed so as to face the direction perpendicular to the specimen S. Then, the excitation-light source 25 is activated to emit excitation light.

The excitation light emitted from the excitation-light source 25 is focused by the cylindrical lens 27 in the form of a sheet along a plane intersecting the optical axis Q of the detection optical system 13, is transmitted through the container 15, and is incident on the specimen S via the water W. When the sheet-shaped excitation light is incident on the specimen S, a fluorescent substance in the specimen S is excited along the incident plane of the excitation light, thus producing fluorescence.

Of the fluorescence produced in the specimen S, fluorescence radiated in the direction along the optical axis Q of the detection optical system 13 is collected by the objective lens 17, passes through the barrier filter in the filter wheel 23, is imaged by the imaging lens 19, and is captured by the imaging element 21. Then, the image processing program is executed by the image processing unit 39, an image signal of the specimen S obtained by the imaging element 21 is formed into an image, and the image is displayed on the monitor 9.

Figure 3:
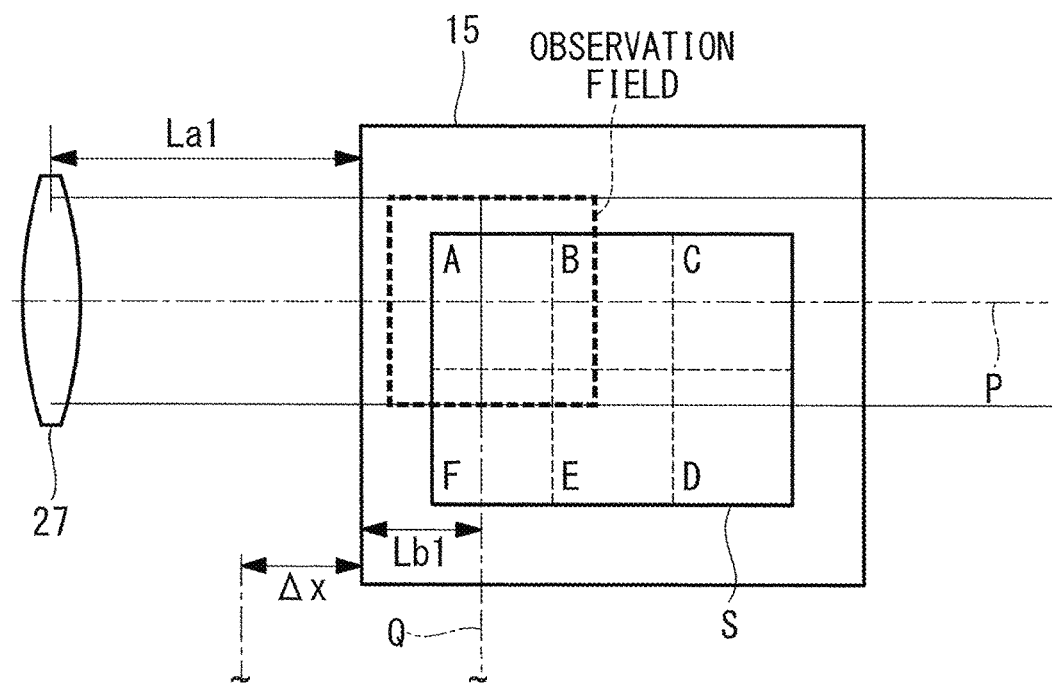
FIG. 3(A) is a view of a state in which an observation area A on the specimen is located within an observation field, seen from the direction along the detection optical axis.
FIG. 3(B) is a view of a state in which an observation area B on the specimen is located within the observation field, seen from the direction along the detection optical axis.
Figure 3:
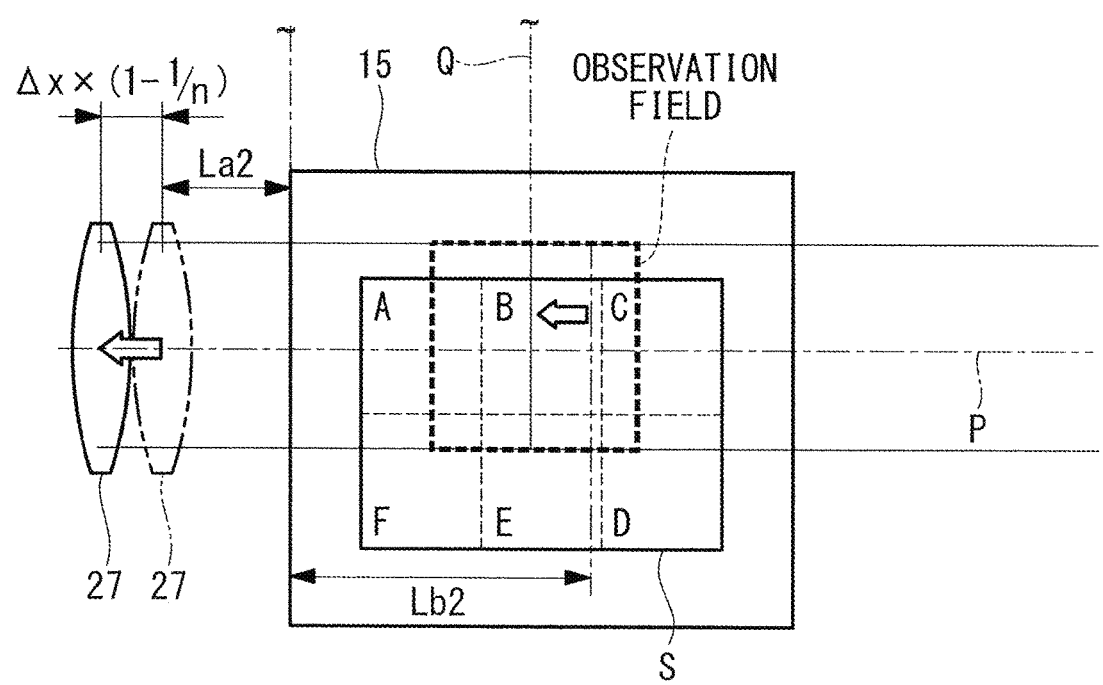
Figure 4:
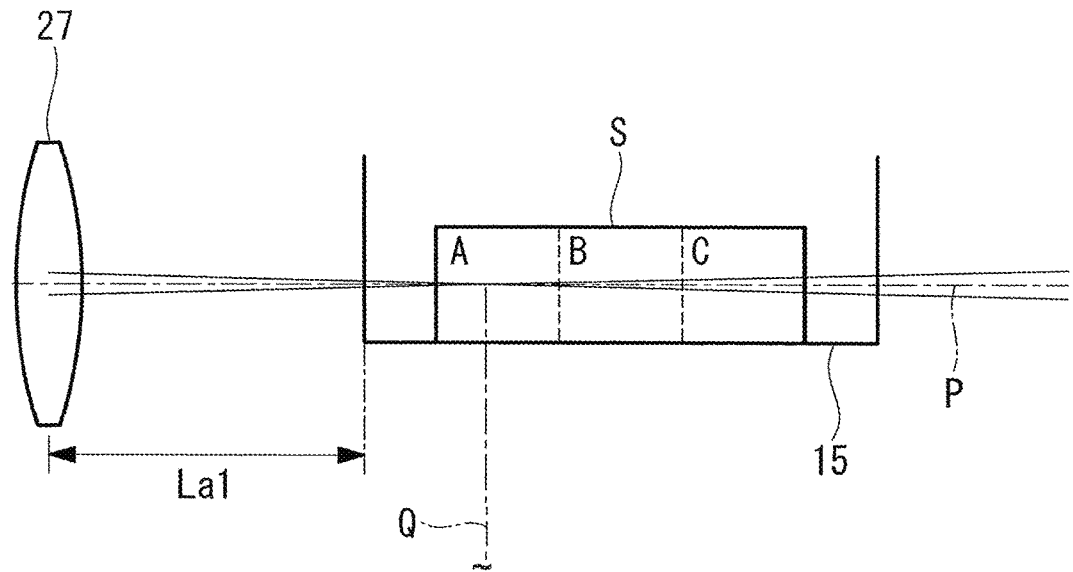
FIG. 4(A) is a view of a state in which the observation area A on the specimen is located within the observation field, seen from the direction perpendicular to the detection optical axis and the illumination optical axis.
FIG. 4(B) is a view of a state in which the observation area B on the specimen is located within the observation field, seen from the direction perpendicular to the detection optical axis and the illumination optical axis.
Figure 4:
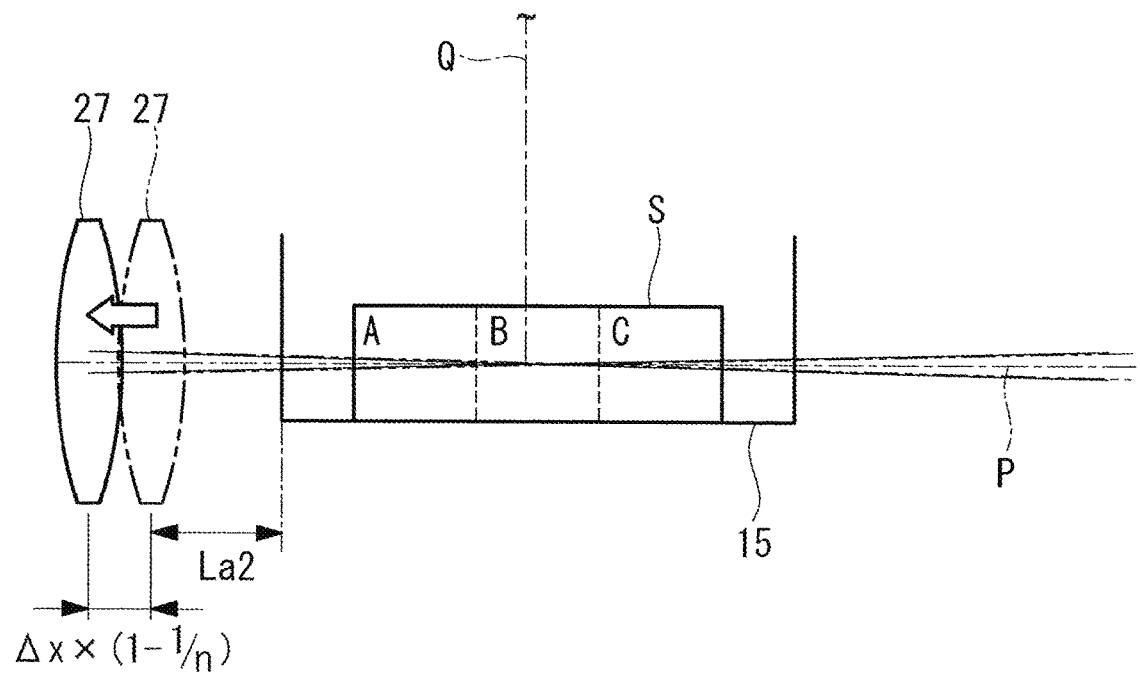

When the sheet-shaped excitation light along the incident plane extending in the direction perpendicular to the optical axis Q is made incident on the specimen S, for example, in a state in which the focal plane of the detection optical system 13 is made coincident with the incident plane of the excitation light, as shown in FIG. 3(A) and FIG. 4(A), the focal position of the cylindrical lens 27 is made coincident with the optical axis Q of the detection optical system 13, thereby making it possible to detect, at one time, fluorescence produced in a wide area along the focal plane of the detection optical system 13 with the imaging element 21 and to acquire a clear fluorescence image of an observation area A on the specimen S.

Next, changing the observation area on the specimen S will be described with reference to the flowchart in FIG. 5.

First, the microscope control unit 35 executes the microscope control program and moves the stage 11 along the optical axis P in the direction toward the cylindrical lens 27, thus moving an observation area B on the specimen S to the inside of an observation field, as shown in FIG. 3(B) and FIG. 4(B) (movement step S1).

Here, when the specimen S is moved, together with the container 15, in the direction along the optical axis P of the cylindrical lens 27, because the ratios of the thicknesses, in the direction along the optical axis P of the cylindrical lens 27, of air, the water W in the container 15, and the specimen S, which exist in the direction along the optical path of excitation light from the cylindrical lens 27 to the optical axis of the detection optical system 13, are changed, the focal position of the cylindrical lens 27 with respect to the optical axis Q of the detection optical system 13 is changed.

In this case, compared with the case of the observation area A, the ratio of the thickness of the air layer, whose refractive index is small, is reduced, and the ratio of the thickness of the specimen S layer, whose refractive index is large, is accordingly increased, in the range from the cylindrical lens 27 to the optical axis Q of the detection optical system 13. Thus, the focal position of the cylindrical lens 27, which has been made coincident with the optical axis Q of the detection optical system 13, is shifted in the direction away from the cylindrical lens 27.

For example, when the specimen S is moved, together with the container 15, by "Δx" along the optical axis P, excitation light that has been focused at a position in the observation area A that is "Lb1" away from a wall surface of the container 15, as shown in FIG. 3(A), is thus focused at a position that is "Lb1+(Δx)×(n)" away from the wall surface of the container 15, as shown in FIG. 3(B) (in FIG. 3(B), at a position that is "Lb2" away from the wall surface of the container 15), not at a position that is "Lb1+Δx" away from the wall surface of the container 15.

In this case, the illumination control unit 37 executes the illumination control program, thus adjusting the focal position of the cylindrical lens 27. Specifically, the illumination control unit 37 first calculates the amount (X), by which the cylindrical lens 27 is to be moved, on the basis of Equation (2) such that the air-equivalent length along the optical path of excitation light from the cylindrical lens 27 to the optical axis Q of the detection optical system 13 is maintained constant. Then, the illumination control unit 37 moves the position of the cylindrical lens 27 by the calculated movement amount (X) in the direction away from the optical axis Q of the detection optical system 13 (focal-position adjustment step S2).

Accordingly, it is possible to prevent, in the observation area B on the specimen S, the focal position of the cylindrical lens 27 from being shifted with respect to the optical axis Q of the detection optical system 13. Therefore, in this state, excitation light that is focused in the form of a sheet by the cylindrical lens 27 is incident on the specimen S (incidence step S3), thereby making it possible to acquire a clear fluorescence image of the observation area B on the basis of fluorescence produced in the specimen S (detection step S4).

Similarly, when the stage 11 is moved to change the observation field from the observation area B to an observation area C, as in the case where the observation field is changed from the observation area A to the observation area B, the illumination control unit 37 adjusts the position of the cylindrical lens 27 on the basis of the movement amount of the specimen S, thereby maintaining the state in which the optical axis Q of the detection optical system 13 is coincident with the focal position of the cylindrical lens 27. Thus, a clear fluorescence image of the observation area C on the specimen S is acquired.

Next, when the stage 11 is moved to change the observation field from the observation area C to an observation area D, the focal position of the cylindrical lens 27 is not shifted with respect to the optical axis Q of the detection optical system 13 in conjunction with movement of the specimen S. Therefore, the position of the cylindrical lens 27 is not adjusted by the illumination control unit 37, and a clear fluorescence image of the observation area D on the specimen S is acquired.

Next, when the stage 11 is moved to change the observation field from the observation area D to an observation area E, i.e., when the specimen S is moved, together with the container 15, along the optical axis P in the direction away from the cylindrical lens 27, compared with the case of the observation area D, the ratio of the thickness of the air layer, whose refractive index is small, is increased, and the ratio of the thickness of the specimen S layer, whose refractive index is large, is accordingly reduced, in the range from the cylindrical lens 27 to the optical axis Q of the detection optical system 13. Thus, the focal position of the cylindrical lens 27, which has been made coincident with the optical axis Q of the detection optical system 13, is shifted in the direction toward the cylindrical lens 27.

In this case, the illumination control unit 37 calculates the amount (X), by which the cylindrical lens 27 is to be moved, on the basis of Equation (2) such that the air-equivalent length along the optical path of excitation light from the cylindrical lens 27 to the optical axis Q of the detection optical system 13 is maintained constant, and then moves the position of the cylindrical lens 27 by the calculated movement amount (X) in the direction toward the optical axis Q of the detection optical system 13. Thus, it is possible to prevent, also in the observation area E on the specimen S, the focal position of the cylindrical lens 27 from being shifted with respect to the optical axis Q of the detection optical system 13 and to acquire a clear fluorescence image.

Similarly, when the stage 11 is moved to change the observation field from the observation area E to an observation area F, as in the case in which the observation field is changed from the observation area D to the observation area E, the illumination control unit 37 adjusts the position of the cylindrical lens 27 on the basis of the movement amount of the specimen S, thereby maintaining the state in which the optical axis Q of the detection optical system 13 is coincident with the focal position of the cylindrical lens 27, and thus a clear fluorescence image is acquired.

As described above, according to the microscope and the microscope-image acquiring method of this embodiment, even when the specimen S is moved to change, in the direction of the optical axis of the cylindrical lens 27, the position where a fluorescence image is acquired, the focal position of the cylindrical lens 27 is adjusted on the basis of the movement amount of the specimen S to maintain constant the air-equivalent length along the optical path of excitation light from the cylindrical lens 27 to the optical axis Q of the detection optical system 13, thereby making it possible to prevent the focal position of the cylindrical lens 27 from being shifted with respect to the optical axis Q of the detection optical system 13. Therefore, with a sheet illumination method, different observation areas on the specimen S can be observed by acquiring clear fluorescence images.

Second Embodiment

Next, a microscope and a microscope-image acquiring method according to a second embodiment of the present invention will be described.

As shown in FIGS. 6(A) and 6(B) and FIGS. 7(A) and 7(B), a microscope 1 of this embodiment differs from that of the first embodiment in that a waterproof XY stage 43 that is accommodated in the container 15 is provided instead of the stage 11, and only the specimen S is moved in the direction of the optical axis of the cylindrical lens 27, with the container 15 being fixed to the microscope body 3.

Identical reference signs are assigned to portions having the same configurations as those in the microscope and the microscope-image acquiring method of the first embodiment, and a description thereof will be omitted.

The container 15 is fixed to the microscope body 3.

The waterproof XY stage 43 can be moved, in the container 15 filled with liquid (medium) m, by the driving unit 12 in two-dimensional directions in a plane perpendicular to the direction of the detection optical axis.

Through execution of the microscope control program, the microscope control unit 35 controls the driving unit 12 on the basis of information about the movement direction and the movement amount for the waterproof XY stage 43 input by the user, to move the waterproof XY stage 43, thus changing, in the container 15, the position of the specimen S.

In this embodiment, the refractive index of air is set to 1.0, the refractive index of the liquid m is set to n1, and the refractive index of the specimen S is set to n2. Then, before the specimen S is moved, the optical path length, in the direction along the optical axis P, in air that exists between the cylindrical lens 27 and an end surface of the container 15 is set to La1, the air-equivalent length of the optical path length Lb1, in the direction along the optical axis P, in the liquid m that exists between the wall surface of the container 15 and the specimen S is set to Lb1/n1, and the air-equivalent length of the optical path length Lc1, in the direction along the optical axis P, in the specimen S from an end surface of the specimen S to the optical axis Q of the detection optical system 13 is set to Lc1/n2. Furthermore, after the specimen S is moved, the optical path length, in the direction along the optical axis P, in air that exists between the cylindrical lens 27 and the end surface of the container 15 is set to La2+X, the air-equivalent length of the optical path length Lb2, in the direction along the optical axis P, in the liquid m that exists between the container 15 to the specimen S is set to Lb2/n1, and the air-equivalent length of the optical path length Lc2, in the direction along the optical axis P, in the specimen S from the end surface of the specimen S to the optical axis Q of the detection optical system 13 is set to Lc2/n2. Here, X is an amount by which the cylindrical lens 27 is to be moved in conjunction with movement of the specimen S in the direction along the optical axis P.

The illumination control unit 37 adjusts the focal position of the cylindrical lens 27 such that the air-equivalent length along the optical path of excitation light from the cylindrical lens 27 to the optical axis Q of the detection optical system 13 is maintained constant before and after the movement of the specimen S, and thus Equation (3) is established:

$$La1+Lb1/n1+Lc1/n2=La2+X+Lb2/n1+Lc2/n2 \quad (3)$$

Furthermore, Equations (4), (5), and (6) are established:

$$La1=La2 \quad (4)$$

$$Lb1-Lb2=\Delta x \quad (5)$$

$$Lc2-Lc1=\Delta x \quad (6)$$

Thus, the amount (X), by which the cylindrical lens 27 is to be moved in conjunction with the movement of the specimen S in the direction along the optical axis P, is calculated by using Equation (7) on the basis of Equations (3) to (6).

$$X=(\Delta x)\times(1/n1-1/n2) \qquad (7)$$

The operation of the thus-configured microscope 1 and the microscope-image acquiring method will now be described.

In order to change the observation area on the specimen S by using the microscope 1 and the microscope-image acquiring method of this embodiment, the microscope control unit 35 executes the microscope control program and moves, in the container 15, the waterproof XY stage 43 along the optical axis P (movement step S1).

Here, when only the specimen S is moved in the direction along the optical axis P of the cylindrical lens 27, with the container 15 being fixed to the microscope body 3, because the ratios of the thicknesses, in the direction along the optical axis P of the cylindrical lens 27, of air, the liquid m in the container 15, and the specimen S, which exist in the direction along the optical path of excitation light from the cylindrical lens 27 to the optical axis Q of the detection optical system 13, are changed, the focal position of the cylindrical lens 27 with respect to the optical axis Q of the detection optical system 13 is changed.

In this case, for example, as shown in FIGS. 6(A) and 6(B) and FIGS. 7(A) and 7(B), as in the case in which the observation field is changed from the observation area A on the specimen S to the observation area B thereon, when the waterproof XY stage 43 is moved along the optical axis P in the direction toward the cylindrical lens 27, the ratio of the thickness of the air layer is not changed, and the ratio of the thickness of the specimen S layer is increased as the thickness of the liquid m layer in the container 15 is reduced, in the range from the cylindrical lens 27 to the optical axis Q of the detection optical system 13.

Figure 6:
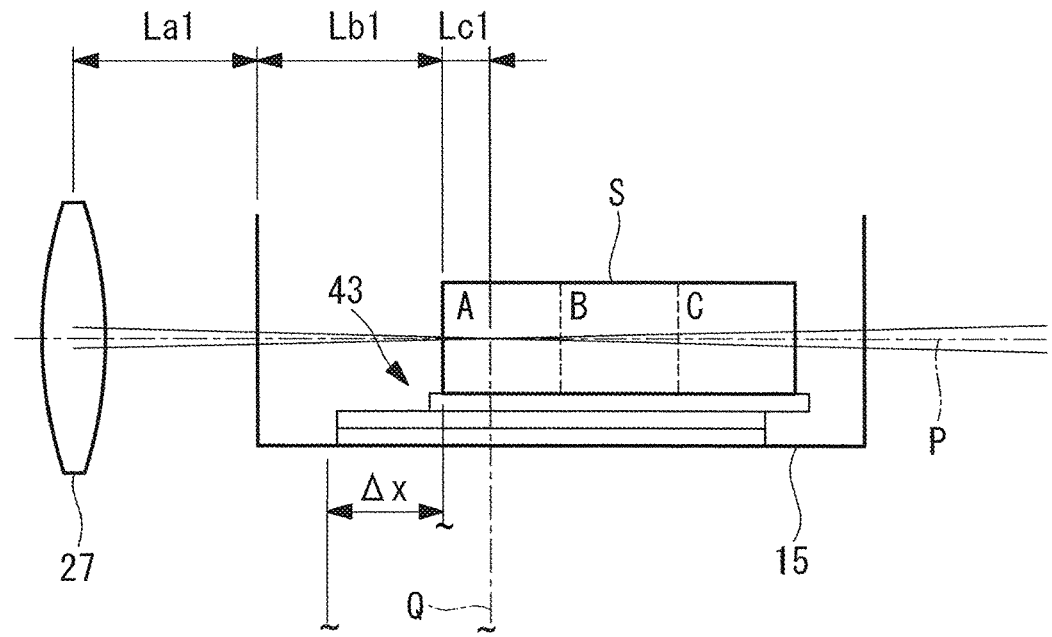
FIG. 6(A) is a view of a state in which an observation area A on the specimen is located within an observation field, seen from the direction perpendicular to the detection optical axis and the illumination optical axis.
FIG. 6(B) is a view of a state in which an observation area B on the specimen is located within the observation field, seen from the direction perpendicular to the detection optical axis and the illumination optical axis.
Figure 6:
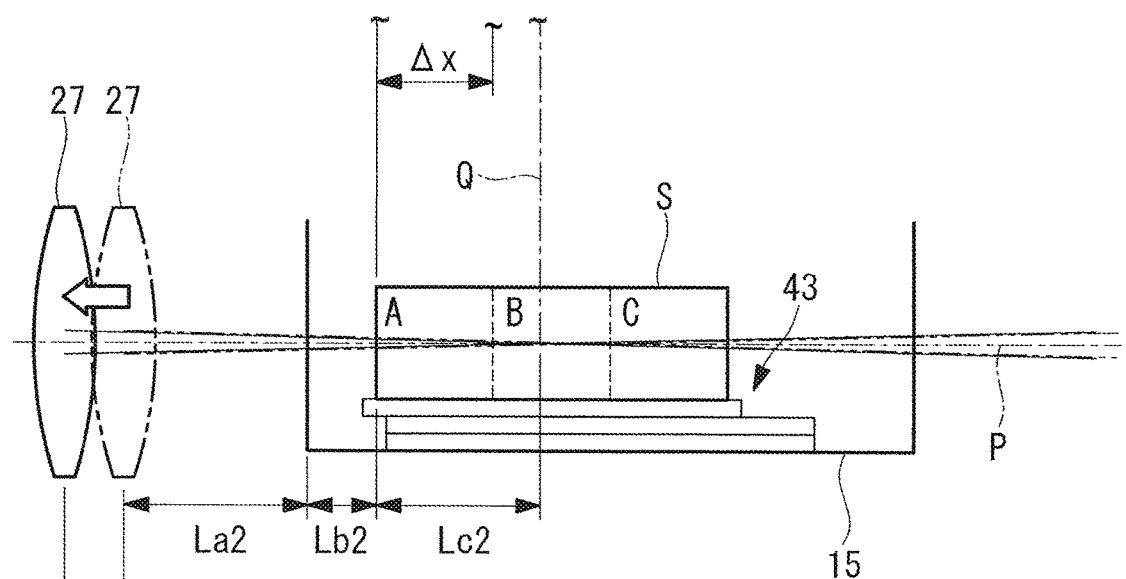

In this case, the illumination control unit 37 calculates the amount (X), by which the cylindrical lens 27 is to be moved in conjunction with the movement of the specimen S in the direction along the optical axis P, by using Equation (7). If the calculated movement amount X is a positive value, the illumination control unit 37 moves the position of the cylindrical lens 27 by the calculated movement amount in the direction away from the optical axis Q of the detection optical system 13, as shown in FIG. 6(B) and FIG. 7(B) (focal-position adjustment step S2). On the other hand, if the calculated movement amount X is a negative value, the illumination control unit 37 moves the position of the cylindrical lens 27 by the calculated movement amount in the direction toward the optical axis Q of the detection optical system 13 (focal-position adjustment step S2).

On the other hand, as in the case in which the observation field is changed from the observation area B on the specimen S to the observation area A thereon, when the waterproof XY stage 43 is moved along the optical axis P in the direction away from the cylindrical lens 27, the ratio of the thickness of the air layer is not changed, and the ratio of the thickness of the specimen S layer is reduced as the thickness of the liquid m layer in the container 15 is increased, in the range from the cylindrical lens 27 to the optical axis Q of the detection optical system 13.

In this case, if the movement amount X, which is calculated by using Equation (7), is a positive value, the illumination control unit 37 moves the position of the cylindrical lens 27 by the calculated movement amount in the direction away from the optical axis Q of the detection optical system 13 (focal-position adjustment step S2). On the other hand, if the calculated movement amount X is a negative value, the illumination control unit 37 moves the position of the cylindrical lens 27 by the calculated movement amount in the direction toward the optical axis Q of the detection optical system 13 (focal-position adjustment step S2).

Accordingly, the air-equivalent length along the optical path of excitation light from the cylindrical lens 27 to the optical axis Q of the detection optical system 13 is maintained constant, and thus, in the changed observation area on the specimen S, the focal position of the cylindrical lens 27 can be prevented from being shifted with respect to the optical axis Q of the detection optical system 13. Therefore, in this state, excitation light focused by the cylindrical lens 27 in the form of a sheet is made incident on the specimen S (incidence step S3), thereby making it possible to acquire a clear fluorescence image of the changed observation area on the basis of fluorescence produced in the specimen S (detection step S4).

As described above, according to the microscope and the microscope-image acquiring method of this embodiment, when only the specimen S is moved, in the container 15 fixed to the microscope body 3, in the direction along the optical axis P of the cylindrical lens 27, and the difference in refractive index between the liquid m and the specimen S cannot be ignored, a shift in focal position of the cylindrical lens 27 for excitation light is corrected on the basis of Equation (7), thereby making it possible to acquire a clearer observation image.

In the individual embodiments described above, through execution of the image processing program stored in the memory of the PC, the image processing unit 39 may generate a composite image by arranging, at the respective coordinates of the specimen S moved by the driving unit 12, the corresponding fluorescence images of the specimen S acquired by the detection optical system 13. In this case, as described above, the fluorescence images of the observation areas A, B, C, D, E, and F, which are acquired after the position of the cylindrical lens 27 is adjusted in conjunction with movement of the specimen S, may be arranged at the respective coordinates and may be combined.

By doing so, the specimen S can be observed with a larger clear fluorescence image.

Furthermore, in the individual embodiments described above, the illumination control unit 37 calculates the movement amount for the cylindrical lens 27 on the basis of the movement amount of the stage 11; however, instead of this, for example, the illumination control unit 37 may obtain the movement amount for the cylindrical lens 27 by referring to a prestored comparison table between the movement amount of the stage 11 and the focal-point adjustment amount.

Although the embodiments of the present invention have been described above in detail with reference to the drawings, the specific configuration is not limited to those embodiments, and design changes that do not depart from the scope of the present invention are also encompassed. In the first embodiment, although a description has been given of an example case in which water is used as a medium for filling the container 15, the medium is not limited thereto, and it is possible to adopt liquid or a gel-like substance.

Furthermore, in the individual embodiments described above, only the cylindrical lens 27 is moved to adjust the focal position of the cylindrical lens 27; however, instead of this, it is possible to move the whole illumination device 5 in the direction along the optical axis P to adjust the focal position of the cylindrical lens 27. Furthermore, instead of moving the cylindrical lens 27, it is possible to provide a detour optical path formed of a plurality of mirrors between the cylindrical lens 27 and the container 15 and to move the mirrors to change the optical path length of the detour optical path, thereby moving the position of the focal point.

REFERENCE SIGNS LIST 1 microscope
3 microscope body
12 driving unit
13 detection optical system (detector)
27 cylindrical lens (sheet-illumination optical system)
37 illumination control unit (focal-position adjusting unit, controller)
39 image processing unit

The invention claimed is:

1. A microscope comprising:
a detection optical system that detects fluorescence produced in a specimen immersed in a medium having a different refractive index from air and accommodated in a container, and that acquires a fluorescence image;
a sheet-illumination optical system that focuses excitation light emitted from a light source in the form of a plane along a plane intersecting an optical axis of the detection optical system and that makes the planar excitation light incident on the specimen in the container;
a driving unit that moves the specimen in a direction of an optical axis of the sheet-illumination optical system;
arithmetic means for calculating a shift amount for a focal position of the sheet-illumination optical system with respect to a position of the optical axis of the detection optical system based on the refractive index of the medium, when the specimen is moved by the driving unit thereby causing a change in an air-equivalent length along an optical path of the excitation light from the sheet-illumination optical system to the optical axis of the detection optical system; and
a focal-position adjusting unit that adjusts the focal position of the sheet-illumination optical system based on a value calculated by the arithmetic means.

2. The microscope according to claim 1, wherein the driving unit moves the specimen, together with the container, in the direction of the optical axis of the sheet-illumination optical system.

3. The microscope according to claim 1, wherein:
the container is fixed to a microscope body in which the detection optical system is provided; and
the driving unit moves the specimen in the container, which is fixed to the microscope body, in the direction of the optical axis of the sheet-illumination optical system.

4. The microscope according to claim 1, wherein the focal-position adjusting unit adjusts the focal position of the sheet-illumination optical system based on the movement amount of the specimen moved by the driving unit such that the air-equivalent length is maintained to be constant.

5. The microscope according to claim 1, wherein the focal-position adjusting unit adjusts the focal position of the sheet-illumination optical system by moving the sheet-illumination optical system in the direction of the optical axis thereof.

6. The microscope according to claim 1, wherein the driving unit is capable of moving the specimen in two-dimensional directions along an incident plane of the excitation light.

7. The microscope according to claim 1, further comprising an image processing unit that generates a composite image by arraying, at respective coordinates of the specimen moved to by the driving unit, fluorescence images of the specimen acquired by the detection optical system.

8. A sheet-illumination microscope in which a specimen immersed in a medium having a different refractive index from air is irradiated with illumination light in the form of a sheet from a direction intersecting an observation optical axis and is observed, the sheet-illumination microscope comprising:
an objective lens that collects light produced in the specimen, which is immersed in the medium and is accommodated in a container;
a detector that detects the light collected by the objective lens;
a sheet-illumination optical system that focuses, in the form of a plane, illumination light emitted from a light source and that makes the planar illumination light incident on the specimen in the container along a plane intersecting an optical axis of the objective lens;
a focal-point adjusting mechanism that moves a focal position of the sheet-illumination optical system in a direction of an optical axis of the sheet-illumination optical system;
a stage that can move at least one of the container and the specimen in the direction of the optical axis of the sheet-illumination optical system; and
a controller that (i) calculates a shift amount for the focal position of the sheet-illumination optical system with respect to a position of the optical axis of the objective lens based on the refractive index of the medium, when the stage is moved thereby causing a change in an air-equivalent length along an optical path of excitation light from the sheet-illumination optical system to the optical axis of the objective lens, and (ii) controls the focal-point adjusting mechanism to adjust the focal position of the sheet-illumination optical system based on the shift amount having been calculated.

9. The sheet-illumination microscope according to claim 8, wherein the stage has the container mounted thereon and moves the specimen together with the container.

10. The sheet-illumination microscope according to claim 8, wherein the controller performs control so as to adjust the focal position of the sheet-illumination optical system based on a movement amount of the stage such that the air-equivalent length is maintained to be constant.

11. A microscope-image acquiring method comprising:
moving a specimen immersed in a medium having a different refractive index from air and accommodated in a container in a direction along an optical axis of a sheet-illumination optical system, the optical axis of the sheet-illumination optical system intersecting an optical axis of a detection optical system;
focusing, with the sheet-illumination optical system, excitation light emitted from a light source in the form of a plane along a plane intersecting the optical axis of the detection optical system and making the planar excitation light incident on the specimen;
calculating a shift amount for a focal position of the sheet-illumination optical system with respect to a position of the optical axis of the detection optical system based on the refractive index of the medium, when the specimen is moved in the moving thereby causing a change in an air-equivalent length along an optical path of the excitation light from the sheet-illumination optical system to the optical axis of the detection optical system;
adjusting the focal position of the sheet-illumination optical system based on a value calculated in the calculating so as not to be shifted from the position of the optical axis of the detection optical system; and detecting, with the detection optical system, fluorescence produced in the specimen on which the excitation light is made incident.

12. The microscope-image acquiring method according to claim 11, wherein the specimen is moved together with the container in the direction along the optical axis of the sheet-illumination optical system.

13. The microscope-image acquiring method according to claim 11, wherein:
the container is fixed to a microscope body in which the detection optical system is provided; and
the specimen in the container, which is fixed to the microscope body, is moved in the direction along the optical axis of the sheet-illumination optical system.

14. The microscope-image acquiring method according to claim 11, wherein, in the adjusting the focal position, the focal position of the sheet-illumination optical system is adjusted based on a movement amount of the specimen such that the air-equivalent length is maintained to be constant.

* * * * *